United States Patent
Erickson

(10) Patent No.: US 8,601,918 B2
(45) Date of Patent: Dec. 10, 2013

(54) TOOLHOLDER ASSEMBLY

(75) Inventors: Robert Alfred Erickson, Raleigh, NC (US); Carla A. Erickson, legal representative, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 1001 days.

(21) Appl. No.: 12/687,977

(22) Filed: Jan. 15, 2010

(65) Prior Publication Data

US 2011/0174121 A1 Jul. 21, 2011

(51) Int. Cl.
*B23B 29/00* (2006.01)
*B23B 31/02* (2006.01)

(52) U.S. Cl.
USPC ............................................. 82/160; 82/158

(58) Field of Classification Search
USPC ............ 82/158, 160; 409/234; 279/2.21, 2.23
See application file for complete search history.

(56) References Cited

U.S. PATENT DOCUMENTS

| | | | |
|---|---|---|---|
| 4,708,040 A | 11/1987 | Erickson | |
| 4,723,877 A | 2/1988 | Erickson | |
| 4,836,068 A | 6/1989 | Erickson | |
| 4,932,295 A | 6/1990 | Erickson | |
| 5,173,017 A * | 12/1992 | Oshnock et al. | 409/234 |
| 5,415,066 A | 5/1995 | Erickson et al. | |
| 5,452,631 A * | 9/1995 | Erickson | 82/160 |
| 5,697,740 A * | 12/1997 | Von Haas et al. | 409/234 |
| 5,870,935 A | 2/1999 | Erickson et al. | |
| 5,927,168 A * | 7/1999 | Needham | 82/160 |
| 6,000,306 A | 12/1999 | Erickson | |
| 6,196,094 B1 * | 3/2001 | Erickson | 82/158 |
| 6,343,903 B1 * | 2/2002 | Huang et al. | 409/231 |
| 6,966,728 B1 | 11/2005 | Erickson | |
| 8,220,804 B2 * | 7/2012 | Erickson et al. | 279/2.11 |

* cited by examiner

*Primary Examiner* — Will Fridie, Jr.
(74) *Attorney, Agent, or Firm* — Larry R. Meenan, Esq.

(57) ABSTRACT

A toolholder assembly for releasably holding a toolholder includes a toolholder having a tubular shank with at least two perforations; a tool support member; a canister disposed within the tool support member and including at least two apertures; a lock rod movable within the tool support member in a reciprocating motion for pulling the toolholder into a locked position and for releasing the toolholder to an unlocked position; and at least two locking elements disposed within the spaced apertures of the canister and engaging the lock rod so that movement of the lock rod causes the locking elements to extend radially outward from the canister. The circumferentially spaced perforations of the tubular shank each include a primary cylindrical wall and a forward facing contact surface at least partially defined by a depression having a converging wall surface non-concentric with the primary cylindrical wall of the perforations.

19 Claims, 4 Drawing Sheets

TOOLHOLDER ASSEMBLY

BACKGROUND OF THE INVENTION

1. Field of the Invention

The present invention relates to tooling for machining operations and, more particularly, relates to a toolholder assembly that precisely locates a toolholder at a selected location within a tool support member during a machining operation.

2. Description of Related Art

Minimizing the down time of a machine tool in a production environment is critical to the success of a machining facility. Historically, one major contribution to such down time was the time needed to change damaged or worn out cutting tools used by the machine tool. A cutting tool is held by a toolholder, which is typically mounted within a tool support member secured to a machine tool. When the cutting tool must be replaced, the entire toolholder with the cutting tool attached thereto is removed from the support member.

A number of couplings are designed to permit quick connecting and disconnecting of the toolholder to and from the tool support member to expedite the tool changing process. One such device is described in U.S. Pat. No. 4,723,877 entitled "Toolholder." This patent is co-owned by the Assignee of the present application and is hereby incorporated by reference in its entirety. The toolholder assembly described in that patent utilizes two locking balls which are urged radially outwardly within a tool support member to engage apertures on the shank of a toolholder. While this arrangement is efficient and permits a toolholder to be removed or secured to a tool support member in a short amount of time, the associated assembly uses apertures in the ball canister and the shank of the toolholder having a diameter slightly larger than the diameter of the locking balls. As a result, the balls are free to roll slightly along the sides of the apertures and lock the toolholder in place in slightly different radial positions. In the worst case, the ball could locate up to 0.002" on either side of the center in both the canister and the toolholder shank resulting in a maximum displacement of 0.004" of the toolholder from the specified position. The displacement directly affects the center height location of the insert edges on the cutting tool. Center height accuracy is what controls the diameters of the workpiece in the machine tool, often a critical dimension.

SUMMARY OF THE INVENTION

The present invention provides for a toolholder assembly having a toolholder with a shank and tool support member with a canister of the type described above, but a portion of the apertures, which would be tangent to the locking balls when the toolholder shank is locked within the tool support member, is removed. The locking balls are thereby freed to centralize during locking to eliminate displacement of the toolholder from the specified position during locking.

According to an embodiment of the present invention, a toolholder assembly for releasably holding a toolholder is provided. The toolholder assembly includes a toolholder having a tubular shank on a rearward side thereof. The tubular shank has at least two circumferentially spaced perforations formed therein extending between an inner surface of the tubular shank and an outer surface of the tubular shank. A tool support member has a forwardly facing surface and a bore intersecting the forwardly facing surface and adapted to receive the tubular shank of the toolholder therein. The bore extends rearward from the forwardly facing surface along a longitudinal axis. A canister is disposed within the bore of the tool support member and includes a longitudinal passageway and at least two circumferentially spaced apertures formed therein. A lock rod is at least partially disposed within the longitudinal passageway of the canister and movable within the tool support member in a rearward and forward reciprocating motion for pulling the tubular shank of the toolholder rearward within the bore into a locked position and for releasing the tubular shank of the toolholder from the bore to an unlocked position. At least two locking elements are disposed within the spaced apertures of the canister and engaging the lock rod so that movement of the lock rod causes the locking elements to extend radially outward from the canister into the circumferentially spaced perforations of the tubular shank to engage the tubular shank of the toolholder. The circumferentially spaced perforations of the tubular shank of the toolholder each include a primary cylindrical wall and a forward facing contact surface at least partially defined by a depression having a converging wall surface non-concentric with the primary cylindrical wall of the perforations of the tubular shank.

According to another embodiment of the present invention, a toolholder for mounting in a bore of a forwardly facing surface of a tool support member is provided. The toolholder includes a tool receiving mechanism disposed on a forward side of the toolholder and a tubular shank disposed on a rearward side of the toolholder. The tubular shank has at least two circumferentially spaced perforations formed therein extending between an inner surface of the tubular shank and an outer surface of the tubular shank. The circumferentially spaced perforations of the tubular shank each include a primary cylindrical wall and a forward facing contact surface at least partially defined by a depression having a converging wall surface non-concentric with the primary cylindrical wall of the perforations of the tubular shank.

Further details and advantages of the invention will become clear upon reading the following detailed description in conjunction with the accompanying drawing figures, wherein like parts are designated with like reference numerals throughout.

DESCRIPTION OF PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 4:
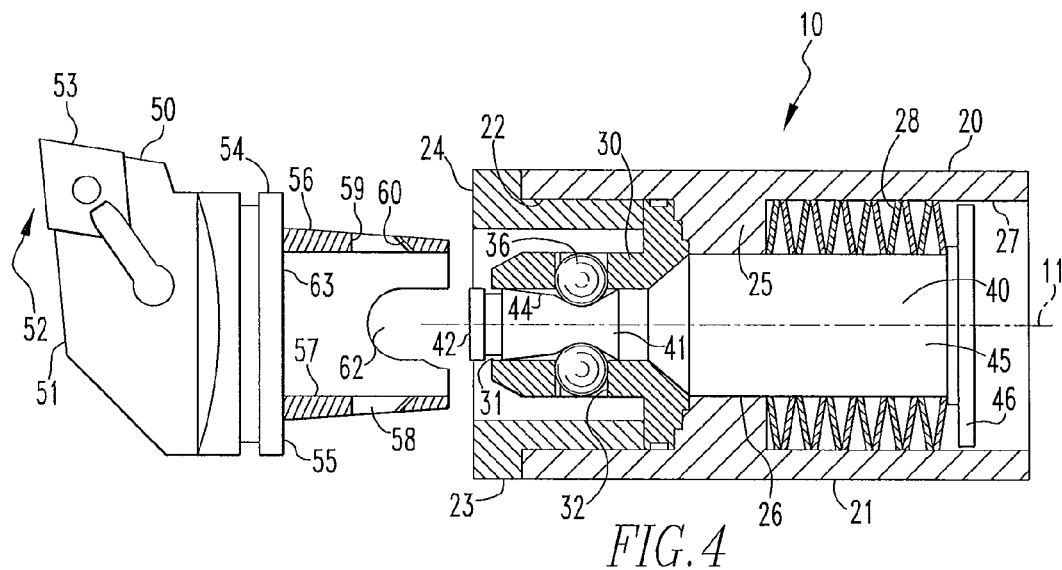
FIG. 4 is a longitudinal partial cross-sectional view of the toolholder assembly in an unlocked position.
Figure 5:
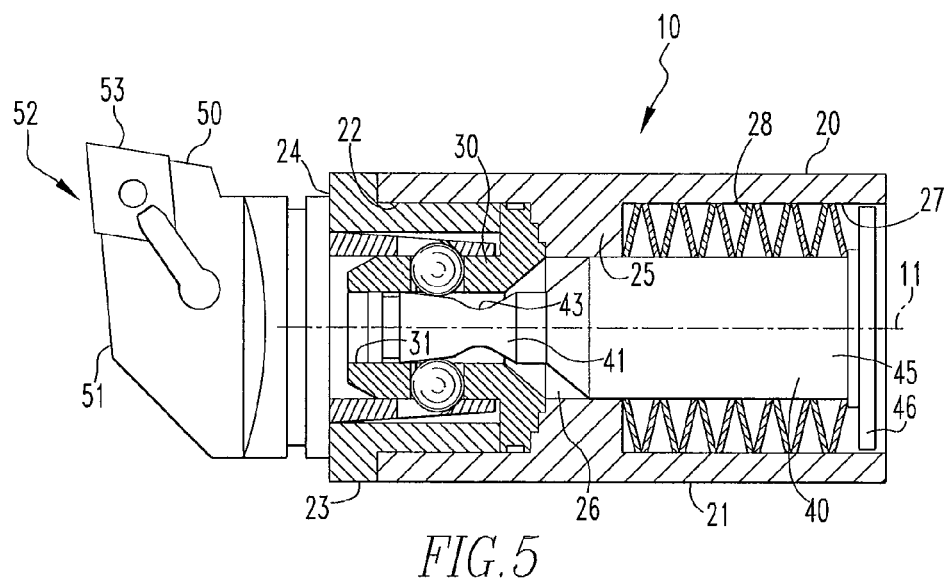
FIG. 5 is a longitudinal partial cross-sectional view of the toolholder assembly in a locked position.

With reference to FIGS. 4 and 5, a toolholder assembly 10 for releasably holding a toolholder 50, according to an embodiment of the present invention, is shown. The goal of the toolholder assembly 10 is to move a lock rod 40 back and forth along a longitudinal axis 11 within a tool support member 20 to secure a toolholder 50 within the tool support member 20 (FIG. 5), or to eject the toolholder 50 from the tool support member 20 (FIG. 5).

The tool support member 20 has a cylindrical body 21 with a forwardly facing surface 24, which is defined by a toolholder receiving member 23 disposed within a forward bore 22 of the cylindrical body 21. The forward bore 22 intersects with the forwardly facing surface 24 and extends rearward from the forwardly facing surface 24 along the longitudinal axis 11 for receiving the tubular shank 56 of the toolholder 50. As shown in FIG. 4, the tubular shank 56 of the toolholder 50 may freely move in and out of the bore 22.

The lock rod 40 has a forward end 41 and a rearward end 45. The lock rod 40 may be rotationally restrained about the longitudinal axis 11. The lock rod 40 is movable within the tool support member 20 in a rearward and forward reciprocating motion for pulling the tubular shank 56 of the toolholder 50 rearward within the bore 22 into a locked position, shown in FIG. 5, and for releasing the tubular shank 56 of the toolholder 50 from the bore 22 to the unlocked position, shown in FIG. 4.

The rearward end 45 of the lock rod 40 is disposed within a rear passageway 27 formed in the cylindrical body 21 of the tool support member 20 and has a flange 46 that extends radially outward, while the cylindrical body 21 of the tool support member 20 has an internal shoulder 25 extending radially inward. The opposing faces of the flange 46 and the internal shoulder 25 capture and compress a set of springs 28 positioned about the lock rod 40 within the rear passage 27 of the cylindrical body 21. The springs 28 may be Bellville washers, as shown, or another compression spring known to those having ordinary skill in the art.

Figure 1:
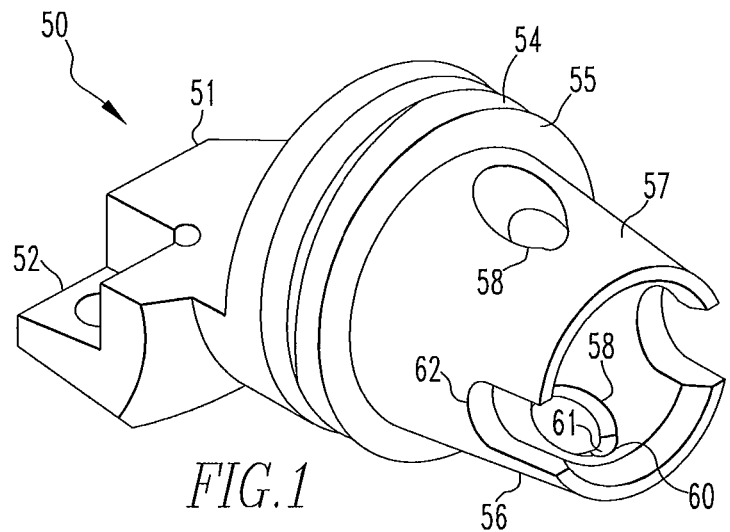
FIG. 1 is a perspective view of a toolholder according to an embodiment of the present invention.
Figure 2:
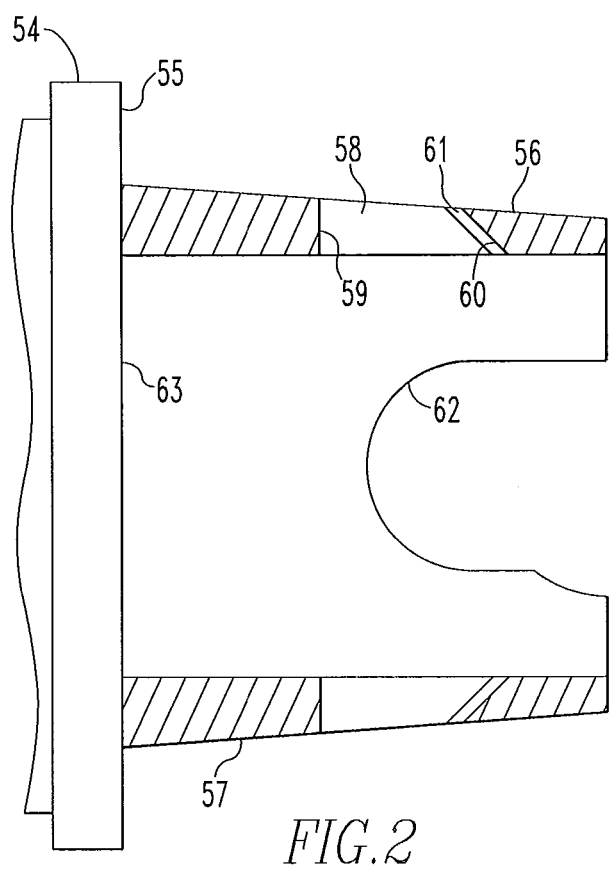
FIG. 2 is a longitudinal partial cross-sectional view of a tubular shank portion of the toolholder shown in FIG. 1.
Figure 3:
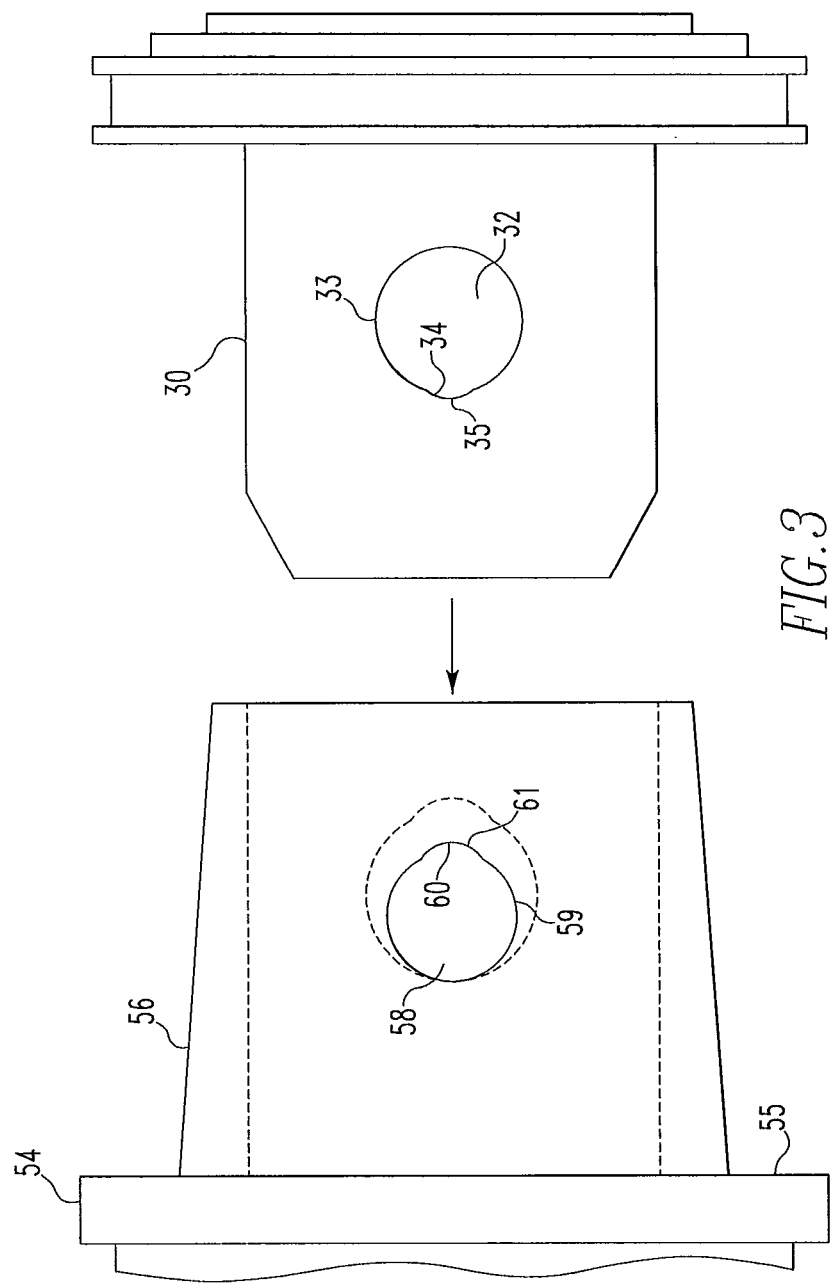
FIG. 3 is a top plan schematic view of a tubular shank of a toolholder and a canister of a tool support member of a toolholder assembly according to an embodiment of the present invention.

The purpose of this toolholder assembly 10 is to secure the toolholder 50 within the tool support member 20. With reference to FIGS. 1-3, the toolholder 50 has a forward side 51 and a rearward side 54. The rearward side 54 of the toolholder 50 has a rearward facing abutment surface 55 and the shank 56 is tubular with a shank wall 57 extending rearward from the rearward side 54 of the toolholder 50. The tubular shank 56 may include an alignment slot 62 extending through the shank wall 57. At least two circumferentially spaced perforations 58 are formed within the shank wall 57 of the tubular shank and extend between an inner surface and an outer surface of the shank wall 57. As shown, the circumferentially spaced perforations 58 extend radially with respect to the longitudinal axis 11 and are vertically opposing, though it is to be appreciated that the perforations 58 may be oriented with respect to each other and the longitudinal axis 11, according to any configuration known to those having ordinary skill in the art.

As shown in FIGS. 1-3, the spaced perforations 58 of the tubular shank 56 each include a primary cylindrical wall 59 and a forward facing contact surface 60, which is at least partially defined by a depression within the wall 57 of the tubular shank 56, which has a converging wall surface 61. The converging wall surface 61 is non-concentric with the primary cylindrical wall 59 of the perforations 58. The forward facing contact surfaces 60 of the perforations 58 may have a forward extending slope from the inner surface of the wall 57 of the tubular shank 56 to the outer surface of the wall 57. As shown in FIGS. 1 and 3, portions of the primary cylindrical wall 59 of each of the perforations 58 may also be sloped inwardly toward a center of the perforation 58 from the inner surface of the wall 57 of the tubular shank 56 to the outer surface of the wall, such that the primary cylindrical wall 59 has a frusto-conical shape.

As will be discussed in more detail below, the converging wall surface 61 of each of the perforations 58 of the tubular shank 56 is arcuate and has a secondary radius that is smaller than a primary radius of the primary cylindrical wall. Particularly, the converging wall surface 61 of each of the perforations 58 of the tubular shank 56 extends along a 60° or a 40° arc of the secondary radius. It is to be appreciated, however, that the converging wall surface 61 of each of the perforations 58 may have a variety of different configurations known to those having ordinary skill in the art, such as different arcuate lengths, triangular, polygonal or frusto-conical.

The toolholder assembly 10, shown in FIGS. 4 and 5, is typical of a toolholder used for non-rotating tooling such as a lathe. To that end, the forward side 51 of the toolholder 50 includes a tool receiving mechanism 52 to receive and clamp a cutting insert 53 on the toolholder 50. For instance, the tool receiving mechanism 52 may include a pocket and clamping arm for clamping the cutting insert 53. However, it is to be appreciated that the toolholder assembly 10 may have any one of a variety of clamping mechanisms and may have attached to it any one of a variety of tools that may be associated with either non-rotating or rotating applications.

With further reference to FIGS. 4 and 5, the tool support member 20 has a forward facing surface 24 and a bore 22. Within the bore 22, extending through the tool support member 20 along the longitudinal axis 11, is a canister 30 that extends into the bore 22 of the tool support member 20. A longitudinal passageway 31 extends through the canister 30 and the lock rod 40 is at least partially disposed within the longitudinal passageway 31 of the canister 30.

The forward end 41 of the lock rod 40 extends through an intermediate passageway 26 through the internal shoulder 25 of the body 21 of the tool support member 20. The forward end 41 of the lock rod 40 is slidably disposed within the longitudinal passageway 31 of the canister 30. Depressions 43 are formed in the forward end 41 of the lock rod 40, which may be aligned with radially extending circumferentially spaced apertures 32 formed in the canister 30. When the lock rod 40 is moved to the right, locking elements 36, which are in the form of spherical balls 36 positioned within the apertures 32 of the canister 30 and the depressions 43 in the lock rod 40, are urged radially outwardly by a locking ramp 44 formed on the lock rod 41 forward of and adjacent to the depressions 43. As shown in FIGS. 4 and 5, there are at least two locking elements 36 disposed within at least two circumferentially spaced apertures 32 in the canister 30 and at least two depressions 43 in the forward end 41 of the lock rod 40.

FIG. 4 shows the toolholder 50 removed from the tool support member 20. To secure the toolholder 50 within the tool support member 20, the lock rod 40 must be positioned such that the locking elements 36 are within the depressions 43 and recessed within the spaced apertures 32 of the canister 30. In this orientation, the locking elements 36 are clear of the perforations 58 within the shank 56 of the toolholder 50 and, therefore, the tubular shank 56 of the toolholder 50 may be inserted into the bore 22.

As shown in FIG. 5, the lock rod 40 is biased towards the locked position by the springs 28 disposed about the rearward end 45 of the lock rod 40. In order to secure lock the toolholder 50 within the bore 22 of the tool support member 20, the springs 28 are released from a compressed condition between the internal shoulder 25 of the body 21 of the tool support member 20 and the flange 46 on the rearward end 45 of the lock rod 40, causing the lock rod 40 to move left to right as viewed in FIGS. 4 and 5. As the lock rod 40 moves left to right, the locking ramp 44 moves into engagement with the locking elements 36, which will tend to ride along the locking ramp 44 as the lock rod 40 moves toward the locked position. As the locking elements 36 move along the locking ramp 44, they project outwardly through the spaced apertures 32 in the canister 30. A locking position is achieved once the locking elements 36 are securely seated against the forward facing contact surfaces 60 within the perforations 58 of the tubular shank 56. As the locking elements 36 move up the locking ramp 44, it is to be appreciated that the ramp 44 exerts an outwardly directed force against the locking elements 36, resulting in a radially directed locking load that is, in turn, applied to the shank 56 through the forward facing contact surfaces 60 to secure the toolholder 50 within the tool support member 20.

Since the forward facing contact surfaces 60 are sloped forwardly, the force applied by the locking elements 36 to the shank 56 will tend to draw the tubular shank 56 into the bore 22 until the abutment surface 55 on the rearward side 54 of the toolholder 50 comes into contact with the forward facing abutment surface 24 of the tool support member 20. The wall 57 of the tubular shank 56 is also subject to radial expansion within the bore 22 so that portions of the wall 57 of the tubular shank 56 may come into engagement with the inner surface of the bore 22 in an interference fit.

To release the toolholder 50 from the tool support member 20, the lock rod 40 is urged to the left toward the toolholder 50. In such a manner, the locking elements 36 retract within the spaced apertures 32 of the canister 30 and the depressions 43 on the lock rod 40 so that adequate clearance is provided and the toolholder 50 may be removed from the tool support member 20, as shown in FIG. 4.

As discussed above, when the toolholder 50 is locked within the tool support member 20, there may be elastic deformation of the tubular shank 56, thereby creating high frictional forces retaining the toolholder 50 within the tool support member 20. To release the toolholder 50, the lock rod 40 is extended past the forward end of the tool support member 20 such that a forward surface 42 of the lock rod 40 protrudes beyond the canister 30 and the tool support member 20 contacts an impact surface 63 on the rearward side 54 of the toolholder 50, thereby ejecting the toolholder 50 from the tool support member 20. Therefore, by moving the lock rod 40, the toolholder 50 may be secured or released within the tool support member 20, thereby providing for quick change of the toolholder 50.

It is to be appreciated that the mechanism for extending and retracting the lock rod 40 within the tool support member 20 is described for purposes of explanation only. The mechanism may be of any type known to those having ordinary skill as being suitable for the system described above. For instance, any one of the mechanisms described in U.S. patent application Ser. No. 12/366,137, filed on Feb. 5, 2009, and U.S. Pat. Nos. 5,415,066, 4,747,735, 4,932,295, 5,870,935, and 7,610,834, all of which are assigned to the Assignee of the present application and each of which is hereby incorporated by reference in its entirety.

Figure 6:
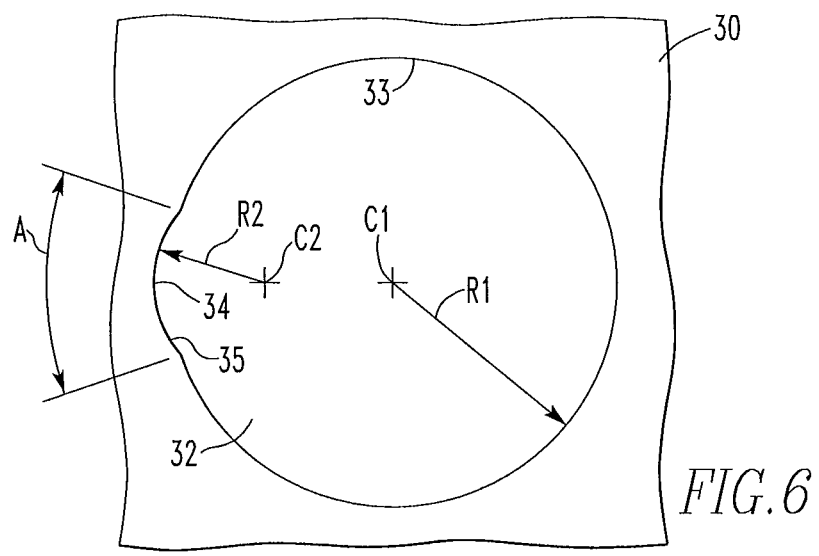
FIG. 6 is an enlarged representation of a radial perforation in the canister of the tool support member according to an embodiment of the present invention.

With further reference to FIGS. 3 and 6, the spaced apertures 32 of the canister 30 each include a primary cylindrical wall 33 and a rearward facing contact surface 34. As shown in FIG. 5, as the locking elements 36 come into contact with the forward facing contact surfaces 60 of the perforations 58 in the tubular shank 56, they will also locate against the rearward facing contact surface 34 of the apertures 32 in the canister 30 in order to draw the tubular shank 56 of the toolholder 50 into the bore 22. As shown, the rearward facing contact surface 34 of each aperture 32 is at least partially defined by a depression having a converging wall surface 35 that is non-concentric with the primary cylindrical wall 33 of the spaced apertures 32 of the canister 30. As shown, the circumferentially spaced apertures 32 extend radially, with respect to the longitudinal axis 11, and are vertically opposing, though it is to be appreciated that the apertures 32 may be oriented with respect to each other and the longitudinal axis 11, according to any configuration known to those having ordinary skill in the art. Additionally, the spaced apertures 32 need not extend perpendicular to the longitudinal axis 11, as is shown in FIGS. 4 and 5, but may be angled toward the toolholder 50.

FIG. 3 illustrates a top plan schematic view of the tubular shank 56 of the toolholder 50 and the canister 30 to demonstrate the configuration of the perforations 58 in the tubular shank 56 and the canister 30. As shown in FIG. 3, the converging wall surfaces 35 of the spaced apertures 32 of the canister 30 and the converging wall surfaces 61 of the perforations 58 in the tubular shank 56 have corresponding and opposing shapes. Accordingly, when the tubular shank 56 is in the locked position within the bore 22 of the tool support member 20, the locking elements 36 will locate within the depressions defined by the respective converging wall surfaces 35, 61. It is to be appreciated that due to the configuration of the respective converging wall surfaces 35, 61, that a locking element 36 will engage each of the converging wall surfaces 35, 61 in at least single point contact on each side of the depressions, resulting in at least two point contact between the locking element 36 and each of the converging wall surfaces 35, 61. The at least two point contact ensures that the locking elements 36 will become centralized along the longitudinal axis 11. In this manner, the tubular shank 56 of the toolholder 50 can be secured within the bore 22 of the tool support member 20 with a high degree of radial accuracy and repeatability.

FIG. 6 illustrates a schematic representation of a spaced aperture 32 of the canister 30 according to an embodiment of the present invention. It is to be appreciated that the perforations 58 in the tubular shank 56 have a similar, but opposing, configuration and, therefore, the following discussion applies equally as well to the perforations 58 in the tubular shank 56. As shown in FIG. 6, the aperture 32 has a primary cylindrical wall 33, which extends with a primary radius R1 about a primary center point C1. The converging wall surface 35 of the rearward facing contact surface 34 is arcuate and extends with a secondary radius R2 about a secondary center point C2 offset from the primary center point C1. The secondary radius R2 of the converging wall surface 35 is smaller than the primary radius R1 of the primary cylindrical wall 33. The converging wall surface 35 extends along an arc circumscribing an angle A of up to 95°, particularly 40°.

Figure 7:
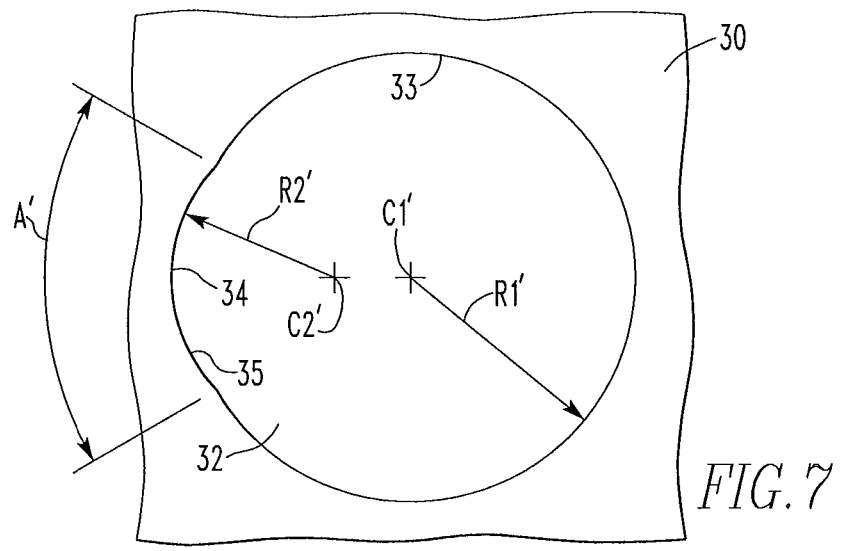
FIG. 7 is an enlarged representation of a radial perforation in the canister of the tool support member according to another embodiment of the present invention.

FIG. 7 illustrates a schematic representation of the spaced aperture 32 of the canister 30 according to an alternative embodiment of the present invention. As shown, the aperture 32 has a primary cylindrical wall 33, which extends with a primary radius RP about a primary center point C1'. The converging wall surface 35 of the rearward facing contact surface 34 is arcuate and extends with a secondary radius R2' about a secondary center point C2' offset from the primary center point C1'. The secondary radius R2' of the converging wall surface 35 is smaller than the primary radius R1' of the primary cylindrical wall 33. The converging wall surface 35 extends along an arc circumscribing an angle A' of up to 95°, particularly 60°. It is to be appreciated that the converging wall surface 35 of each of the apertures 32 may have a variety of different configurations known to those having ordinary skill in the art, such as different arcuate lengths, triangular, polygonal, or frusto-conical.

While several embodiments of a toolholder assembly were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

What is claimed is:

1. A toolholder assembly for releasably holding a toolholder, the toolholder assembly comprising:
   a toolholder having a tubular shank on a rearward side thereof, the tubular shank having at least two circumferentially spaced perforations formed therein extending between an inner surface of the tubular shank and an outer surface of the tubular shank;
   a tool support member having a forwardly facing surface and a bore intersecting the forwardly facing surface and adapted to receive the tubular shank of the toolholder therein, the bore extending rearward from the forwardly facing surface along a longitudinal axis;
   a canister disposed within the bore of the tool support member, the canister including a longitudinal passageway and at least two circumferentially spaced apertures formed therein;
   a lock rod at least partially disposed within the longitudinal passageway of the canister and movable within the tool support member in a rearward and forward reciprocating motion for pulling the tubular shank of the toolholder rearward within the bore into a locked position and for releasing the tubular shank of the toolholder from the bore to an unlocked position; and
   at least two locking elements disposed within the spaced apertures of the canister and engaging the lock rod so that movement of the lock rod causes the locking elements to extend radially outward from the canister into the circumferentially spaced perforations of the tubular shank to engage the tubular shank of the toolholder,
   wherein the circumferentially spaced perforations of the tubular shank of the toolholder each include a primary cylindrical wall and a forward facing contact surface at least partially defined by a depression having a converging wall surface non-concentric with the primary cylindrical wall of the perforations of the tubular shank.

2. The toolholder assembly of claim 1, wherein the forward facing contact surfaces of the circumferentially spaced perforations of the tubular shank each have a forward extending slope from the inner surface of the tubular shank to the outer surface of the tubular shank.

3. The toolholder assembly of claim 1, wherein the converging wall surface of each of the perforations of the tubular shank is arcuate and has a secondary radius smaller than a primary radius of the primary cylindrical wall.

4. The toolholder assembly of claim 3, wherein the converging wall surface of each of the perforations of the tubular shank extends along an arc of up to 95°.

5. The toolholder assembly of claim 3, wherein the converging wall surface of each of the perforations of the tubular shank extends along a 60° arc.

6. The toolholder assembly of claim 3, wherein the converging wall surface of each of the perforations of the tubular shank extends along a 40° arc.

7. The toolholder assembly of claim 1, wherein the circumferentially spaced apertures of the canister each include a primary cylindrical wall and a rearward facing contact surface at least partially defined by a depression having a converging wall surface non-concentric with the primary cylindrical wall of the apertures of the canister.

8. The toolholder assembly of claim 7, wherein the converging wall surface of each of the apertures of the canister is arcuate and has a secondary radius smaller than a primary radius of the primary cylindrical wall.

9. The toolholder assembly of claim 8, wherein the converging wall surface of each of the apertures of the canister extends along an arc of up to 95°.

10. The toolholder assembly of claim 8, wherein the converging wall surface of each of the apertures of the canister extends along a 60° arc.

11. The toolholder assembly of claim 8, wherein the converging wall surface of each of the apertures of the canister extends along a 40° arc.

12. The toolholder assembly of claim 7, wherein the converging wall surfaces of the circumferentially spaced apertures of the canister and the converging wall surfaces of the circumferentially spaced perforations of the tubular shank have corresponding and opposing shapes.

13. The toolholder assembly of claim 12, wherein the locking elements are balls and the converging wall surfaces of the circumferentially spaced apertures of the canister and the circumferentially spaced perforations of the tubular shank are configured to centralize the balls along the longitudinal axis of the bore.

14. A toolholder for mounting in a bore of a forwardly facing surface of a tool support member, the toolholder comprising:
    a tool receiving mechanism disposed on a forward side of the toolholder; and
    a tubular shank disposed on a rearward side of the toolholder, the tubular shank having at least two circumferentially spaced perforations formed therein extending between an inner surface of the tubular shank and an outer surface of the tubular shank,
    wherein the circumferentially spaced perforations of the tubular shank each include a primary cylindrical wall and a forward facing contact surface at least partially defined by a depression having a converging wall surface non-concentric with the primary cylindrical wall of the perforations of the tubular shank.

15. The toolholder of claim 14, wherein the forward facing contact surfaces of the circumferentially spaced perforations of the tubular shank each have a forward extending slope from the inner surface of the tubular shank to the outer surface of the tubular shank.

16. The toolholder of claim 14, wherein the converging wall surface of each of the perforations of the tubular shank is arcuate and has a secondary radius smaller than a primary radius of the primary cylindrical wall.

17. The toolholder of claim 16, wherein the converging wall surface of each of the perforations of the tubular shank extends along an arc of up to 95°.

18. The toolholder of claim 16, wherein the converging wall surface of each of the perforations of the tubular shank extends along a 60° arc.

19. The toolholder of claim 16, wherein the converging wall surface of each of the perforations of the tubular shank extends along a 40° arc.

* * * * *